US008769173B2

(12) United States Patent  
Cardinell et al.

(10) Patent No.: US 8,769,173 B2
(45) Date of Patent: Jul. 1, 2014

(54) SYSTEMS AND METHODS FOR DETECTING SUPPORTED SMALL FORM-FACTOR PLUGGABLE (SFP) DEVICES

(75) Inventors: Charles S. Cardinell, Tucson, AZ (US);
Roger G. Hathorn, Tucson, AZ (US);
Steven E. Klein, Tucson, AZ (US);
Ashwani Kumar, Tucson, AZ (US);
Daniel W. Sherman, Los Angeles, CA (US)

(73) Assignee: International Business Machines Corporation, Armonk, NY (US)

( * ) Notice: Subject to any disclaimer, the term of this patent is extended or adjusted under 35 U.S.C. 154(b) by 388 days.

(21) Appl. No.: 12/904,721

(22) Filed: Oct. 14, 2010

(65) Prior Publication Data

US 2012/0096190 A1  Apr. 19, 2012

(51) Int. Cl.
*G06F 13/12* (2006.01)
*G06F 13/00* (2006.01)

(52) U.S. Cl.
CPC ........ *G06F 13/00* (2013.01); *G06F 2213/0008* (2013.01)
USPC .............................. 710/68; 710/16

(58) Field of Classification Search
None
See application file for complete search history.

(56) References Cited

U.S. PATENT DOCUMENTS

| 7,317,689 | B1 | 1/2008 | Liu | |
|---|---|---|---|---|
| 7,779,266 | B2 | 8/2010 | Su | |
| 8,159,956 | B2 * | 4/2012 | Noble et al. | 370/241 |
| 2003/0091037 | A1 * | 5/2003 | Latif et al. | 370/355 |
| 2004/0081196 | A1 * | 4/2004 | Elliott | 370/465 |
| 2004/0083192 | A1 * | 4/2004 | Elliott | 706/26 |
| 2005/0044335 | A1 * | 2/2005 | Bee et al. | 711/170 |
| 2005/0114083 | A1 * | 5/2005 | Bullis | 702/183 |
| 2005/0282413 | A1 | 12/2005 | Israel et al. | |
| 2006/0189220 | A1 * | 8/2006 | Duval et al. | 439/760 |
| 2006/0277346 | A1 | 12/2006 | Doak et al. | |
| 2007/0124413 | A1 * | 5/2007 | Diab et al. | 709/217 |
| 2007/0180145 | A1 | 8/2007 | Scheibe | |

(Continued)

FOREIGN PATENT DOCUMENTS

| CN | 1773939 A | 5/2006 |
|---|---|---|
| JP | 2008005061 A | 1/2008 |

OTHER PUBLICATIONS

Princeton Online Dictionary, 1 page. Obtained Electronically: May 30, 2012.*

(Continued)

*Primary Examiner* — Henry Tsai
*Assistant Examiner* — Christopher Bartels
(74) *Attorney, Agent, or Firm* — Griffiths & Seaton PLLC (57) ABSTRACT

Systems and methods for detecting supported small form-factor pluggable (SFP) devices in an adapter are provided. One system includes multiple ports, each port configured to be coupled to a SFP device, a tracking device configured to store data representing a list of supported SFP devices for the adapter, and a processor coupled to each of the plurality of ports and the tracking device. The processor is configured to scan each port at start-up, determine if any of the ports is coupled to a non-supported SFP device, and disable any ports that are coupled to a non-supported SFP device. One method includes scanning each port at start-up, determining if any of the ports is coupled to a non-supported SFP device, and disabling any ports that are coupled to a non-supported SFP device. Also provided are computer storage mediums including computer code for performing the above method.

17 Claims, 3 Drawing Sheets

(56) References Cited

U.S. PATENT DOCUMENTS

2008/0025234 A1* 1/2008 Zhu et al. .................. 370/256
2008/0238654 A1 10/2008 DeHaan et al.
2012/0051738 A1* 3/2012 Skirmont et al. ............ 398/25
2012/0102239 A1* 4/2012 Huang .......................... 710/14

OTHER PUBLICATIONS

IBM, 'SFP Diagnostic, IP.com, IPCOM000143264D, Nov. 17, 2006, 3 pages.

* cited by examiner

SYSTEMS AND METHODS FOR DETECTING SUPPORTED SMALL FORM-FACTOR PLUGGABLE (SFP) DEVICES

BACKGROUND OF THE INVENTION

1. Field of the Invention

The present invention relates in general storage systems, and particularly to, systems and methods for detecting supported small form-factor pluggable (SFP) devices.

2. Description of the Related Art

In, for example, a Fibre Channel storage device, there is a host adapter card that handles all Fibre Channel protocol interactions. It is common practice to have a small form-factor pluggable (SFP) device that can be hot-plugged into a port of the host adapter card. The SFP device interfaces the host adapter firmware with a Fibre Channel cable.

Each SFP device typically includes one of two different types of optical lasers, a long-wave SFP laser or a short-wave SFP laser. Long-wave lasers support distances in the kilometer range while short-wave lasers support distances in the hundreds of meters range. The host adapter card is also frequently designed to support either a long-wave SFP laser or a short-wave SFP laser.

With the ability to interchange and hot-plug SFP devices into a host adapter card, several issues have been noticed. The first issue involves using unsupported SFP devices. There are many different vendors that manufacture SFP devices. In theory, all SFP devices should all operate in an identical manner, but this is not always the case. Since SFP devices are "hot-pluggable," an unsupported SFP device may be plugged into the host adapter card, which typically affects the performance of the host adapter card.

The second issue involves compatibility between a host adapter card and a SFP device. Specifically, it is a mistake to combine a long-wave laser SFP device with a short-wave laser host adapter card or vice versa. Because the physical connections of short-wave laser devices and long-wave laser devices are identical, it is possible to connect incompatible host adapter cards and SFP devices.

Using an unsupported SFP device or mixed wave types can lead to unpredictable results, which are frequently hard to diagnose without physical inspection and/or additional instrumentation. One potential negative impact is corrupted data being received or sent by the SFP device, which requires frequent data re-driving and congestion. Another potential negative impact is the failure to bring the Fibre Channel link up, which would render the link useless since access to the machine would be prevented.

One known solution is to physically label the SFP device and the host adapter card. This label could include a serial number or part number, which would have to be cross referenced to determine the SFP manufacturer and/or wave type. The label might also directly include the manufacturer name and/or wave type. The drawback of this solution is that it requires a user to physically look at the two devices and the labels have the potential of being removed, intentionally or inadvertently. Also, once the host adapter card is installed into a machine, it might not be possible to visually inspect the label of the SFP device. Furthermore, there is also the possibility that a batch of SFP devices is mislabeled or that a hostile user will knowingly install an unsupported SFP and, as a result, potentially cause harmful side affects in the computing environment.

SUMMARY OF THE INVENTION

Various embodiments provide systems for detecting supported small form-factor pluggable (SFP) devices in an adapter. One system comprises a plurality of ports, each port configured to be coupled to a SFP device, a tracking device configured to store data representing a first list of supported SFP devices for the adapter, and a processor coupled to each of the plurality of ports and the tracking device. In this embodiment, the processor is configured to scan each port at start-up, determine if any of the plurality of ports is coupled to a non-supported SFP device, and disable any ports that are coupled to a non-supported SFP device.

Various other embodiments provide methods for detecting supported small form-factor pluggable (SFP) devices in an adapter including a plurality of ports, each port configured to be coupled to a SFP device, a tracking device configured to store data representing a first list of supported SFP devices for the adapter, and a processor coupled to each of the plurality of ports and the tracking device. One method comprises scanning, by the processor, each port at start-up, determining if any of the plurality of ports is coupled to a non-supported SFP device, and disabling any ports that are coupled to a non-supported SFP device.

Also included are physical computer storage mediums (an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) comprising a computer program product method for detecting supported small form-factor pluggable (SFP) devices in an adapter including a plurality of ports, each port configured to be coupled to a SFP device, a tracking device configured to store data representing a first list of supported SFP devices for the adapter, and a processor coupled to each of the plurality of ports and the tracking device. One physical storage medium comprises computer code for scanning, by the processor, each port at start-up, computer code for determining if any of the plurality of ports is coupled to a non-supported SFP device, and computer code for disabling any ports that are coupled to a non-supported SFP device.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide systems and methods for detecting supported small form-factor pluggable (SFP) devices in an adapter. Also provided are physical computer storage mediums comprising computer code for detecting supported SFP devices in an adapter.

Figure 1:
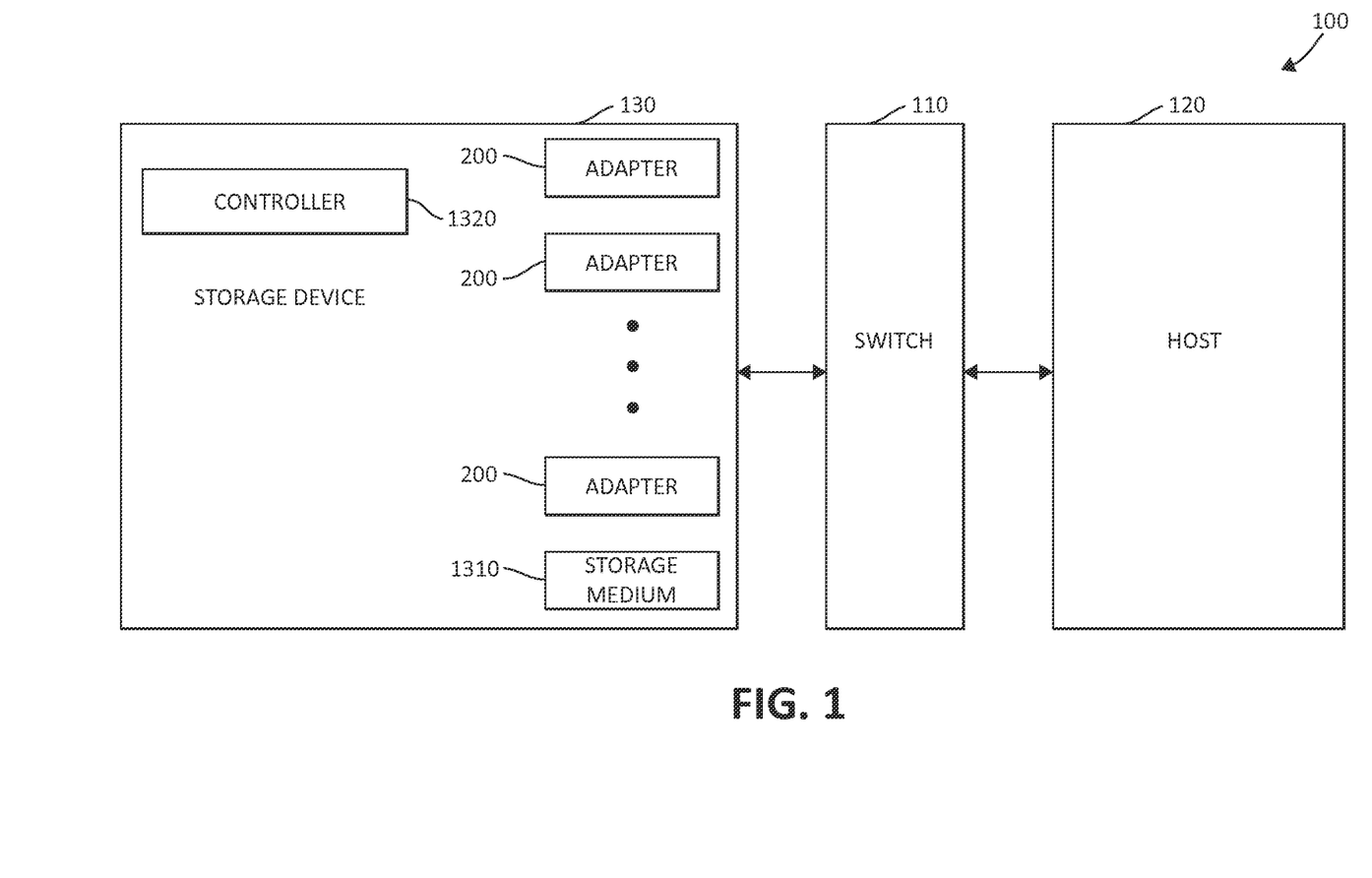
FIG. 1 is a block diagram of one embodiment of a storage system comprising a plurality of adapters capable of detecting non-supported small form-factor pluggable (SFP) devices.

Turning now to the figures, FIG. 1 is a block diagram of one embodiment of a storage system 100. At least in the illustrated embodiment, system 100 comprises a switch 110 coupling a host 120 to a storage device 130.

Switch 110 may be any switch known in the art or developed in the future capable of enabling host 120 and storage device 130 to communicate with one another. Although FIG. 1 shows system 100 as any only including a single switch 110, various other embodiments of system 100 include more than one switch 110. In addition, although FIG. 1 shows host 120 directly coupled to storage device 130 via switch 110, various other embodiments of system 100 are configured such that switch 110 forms at least a portion of a network (e.g., a WAN, a LAN, the Internet, etc.) through which host 120 and storage device 130 are capable of communicating with one another.

Host 120 may be any host known in the art or developed in the future. Host 120 may also be considered a "client" of storage device 130, which may include any type of client relationship known in the art or developed in the future. Although FIG. 1 shows system 100 as only including a single host 120, various other embodiments of system 100 include more than one host 120 in communication with storage device 130.

At least in the illustrated embodiment, storage device 130 comprises a computer-readable storage medium 1310, a controller 1320, and one or more adapters 200 (e.g., Fibre Channel adapters) capable of detecting SFP devices that are supported by each respective adapter 200. Computer-readable storage medium 1310 may be any type of computer-readable storage medium known in the art or developed in the future. For example, storage device 130 may comprise storage tape, an optical storage device, one or more disk storage devices (e.g., a redundant array of independent disks "RAID" configuration, a just a bunch of disks ("JBOD") configuration, etc.), and/or the like computer-readable storage mediums 1310.

In other embodiments, storage device 130 may include more than one computer-readable storage medium 1310. In at least one of these embodiments, storage device 130 includes at least two different types of computer-readable storage mediums 1310.

Processor 1320 may be any type of processor known in the art or developed in the future capable of performing input/output (I/O) operations on storage medium 1310 via adapters 200. Although FIG. 1 shows storage device 130 as including a single processor 1320, various other embodiments of storage device 130 include more than one processor 1320.

Storage device 130 comprises at least one adapter 200 (e.g., a Fibre Channel adapter) capable of detecting SFP devices that are supported by the adapter 200. In the illustrated embodiment, storage device 130 comprises three adapters 200. In various other embodiments, storage device 130 comprises more than three adapters 200. In still another embodiment, storage device 130 comprises two adapters 200.

Figure 2:
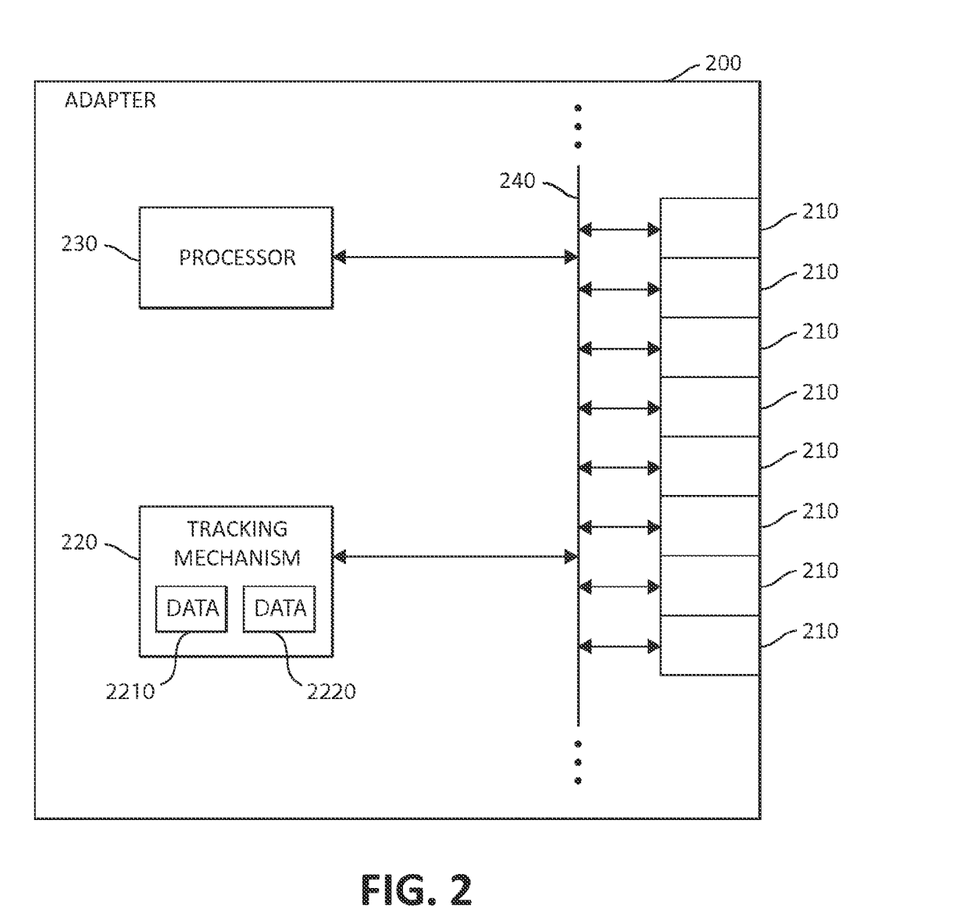
FIG. 2 is a block diagram of one embodiment of an adapter illustrated in FIG. 1.

Turning now to FIG. 2, FIG. 2 is a block diagram of one embodiment of an adapter 200 (e.g., a Fibre Channel adapter) capable of detecting supported small form-factor pluggable (SFP) devices coupled to adapter 200. At least in the illustrated embodiment, adapter 200 comprises multiple ports 210, a tracking mechanism 220, and a processor 230 coupled to one another via a bus 240 (e.g., a wired and/or wireless bus).

In the embodiment illustrated in FIG. 2, adapter 200 comprises eight ports 210. In other embodiments, adapter 200 may include more than eight ports 210 or less than eight ports 210. That is, adapter 200 may include any number of ports 210. In various embodiments, adapter 200 includes a binary number (e.g., one, two, four, eight, sixteen, thirty-two, etc.) of ports 210.

In the various embodiments, each port 210 may be any type of port known in the art or developed in the future. Furthermore, each port 210 is capable of being coupled to a SFP device (not shown), which may be either a short-wave SFP device or a long-wave SFP device.

Tracking mechanism 220 may be any tracking mechanism known in the art or developed in the future capable of storing data 2210 (e.g., Vital Product Data (VPD)) representing a group of supported SFP devices and/or a group of unsupported SFP devices for ports 210 and/or adapter 200, which groups are capable of being updated by a user. In addition, tracking mechanism 220 is configured to store data 2220 representing a designation of status of a SFP device coupled to each port 210. Examples of tracking mechanism 220 include, but are not limited to, one or more bitmaps, one or more tables, one or more lists, metadata, and/or the like tracking mechanisms.

In one embodiment, tracking mechanism 220 defaults the designation or status of each SFP device coupled to ports 210 with an "unknown" designation or status. As the designation or status of each SFP device coupled to ports 210 is determined and/or modified (discussed below), the designation of each port is appropriately modified in tracking mechanism 220 to, for example, a "supported" designation or a "non-supported" designation.

Processor 230, in various embodiments, is configured to scan ports 210 for coupled SFP devices at start-up. As each SFP device is detected, processor 230 is configured to extract an identifier (e.g., VPD) from the SFP device and compare the identifier to the group(s) of supported and/or unsupported SFP devices stored in data 2210. Processor 230 is then configured to determine if the SFP device is a non-supported SFP device for adapter 200.

In one embodiment, a SFP device is a "non-supported" SFP device for adapter 200 if the SFP device is designated as "non-supported" in data 2210. In another embodiment, a SFP device is a "non-supported" SFP device for adapter 200 if the SFP device is not designated as "supported" in data 2210. In yet another embodiment, a SFP device is a "non-supported" SFP device for adapter 200 if the SFP device is designated as "non-supported" in data 2210 and is not designated as "supported" in data 2210.

If processor 230 determines that a supported SFP device is coupled to a particular port 210, processor 230 is configured to change the designation of the SFP device from "unknown" to "supported" in data 2220. If processor 230 determines that an unsupported SFP device is coupled to a particular port 210, processor 230 is configured to disable the particular port 210 (e.g., turn off the light for a Fibre Channel port), change the designation of the SFP device from "unknown" to "non-supported" in data 2220, and notify the user that a non-supported SFP device is coupled to the particular port 210.

After the particular port 210 is disabled (e.g., the light for a Fibre Channel port is off), processor 230 is configured to scan the particular port 210 at predetermined intervals of time to determine if a different SFP device has been subsequently coupled to the particular port 210. In one embodiment, processor 230 is configured to scan the particular port 210 every sixty seconds in determining if a different SFP device has been subsequently coupled to the particular port 210. In other embodiments, processor 230 is configured to scan the particular port 210 at intervals of less than sixty seconds or greater than sixty seconds in determining if a different SFP device has been subsequently coupled to the particular port 210. As such, the predetermined intervals may be any amount of time appropriate for a particular adapter and/or application.

When processor 230 detects that a new SFP device has been coupled to the particular port 210, processor 230 is configured to extract an identifier (e.g., VPD) from the new SFP device and compare the identifier to the group(s) of supported and/or unsupported SFP devices stored in data 2210. Processor 230 is then configured to determine if the new SFP device is a non-supported SFP device for adapter 200.

If processor 230 determines that the new SFP device is a supported SFP device, processor 230 is configured to change the designation of the SFP device from "unknown" to "supported" in data 2220. If processor 230 determines that the new SFP device is an unsupported SFP device, processor 230 is configured to continue scanning the particular port 210 at the predetermined interval such that the port remains identified as being coupled to a "non-supported" SFP device in data 2220. Processor 230 is configured to continue scanning the particular port 210 until a supported SFP device is detected and the designation of the particular port 210 in data 2220 is changed to the "supported" designation or status.

After the designation of a port has been changed to the "supported" designation or status, processor 230 is configured to notify the user that a supported SFP device is coupled to the particular port 210. Processor 230 is further configured to enable the particular port 210 (e.g., turning on the light for a Fibre Channel port) after determining that the SFP device is a supported SFP device.

Processor 230 is further configured to extract the identifier (e.g., VPD) from the supported SFP device, extract the identifier (e.g., VPD) from adapter 200, and compare the identifiers. Processor is also configured to determine if each "supported" SFP device is compatible with adapter 200 based on the comparison.

If the supported SFP device is incompatible with adapter 200, processor 230 is configured to notify the user that the particular port 210 is coupled to an incompatible SFP device. Processor 230 is further configured to detect that a new SFP device has been subsequently coupled to the particular port 210 and extract the identifier (e.g., VPD) from the new SFP device and determine if the new SFP device is a supported SFP device that is compatible with adapter 200.

If the supported SFP device is compatible with adapter 200, processor 230 is configured to enable the SFP device to continue communicating with adapter 200. In one embodiment, processor 230 is configured to determine if the supported SFP device and adapter 200 are both short-wave devices. In another embodiment, processor 230 is configured to determine if the supported SFP device and adapter 200 are both long-wave devices.

After each port 210 is coupled to a supported SFP device that is compatible with adapter 200, processor 230 is configured to continue scanning ports 210 to determine if a new SFP device has been coupled to one or more of ports 210. When a new SFP is detected as being coupled to and/or replacing a previously coupled compatible, supported SFP device, processor 230 is configured to extract the identifier (e.g., VPD) from the new SFP device and determine if the new SFP device is a supported SFP device that is compatible with adapter 200.

Although the various embodiments illustrate that each adapter 200 includes a processor 230 configured to detect non-supported and/or incompatible SFP devices, the present invention is not limited to such embodiments. That is, various other embodiments contemplate that one or more processors 230 may be implemented as at least a portion of storage device 130. Moreover, various other embodiments contemplate the one or more adapters 200 may include more than one processor 230.

Figure 3:
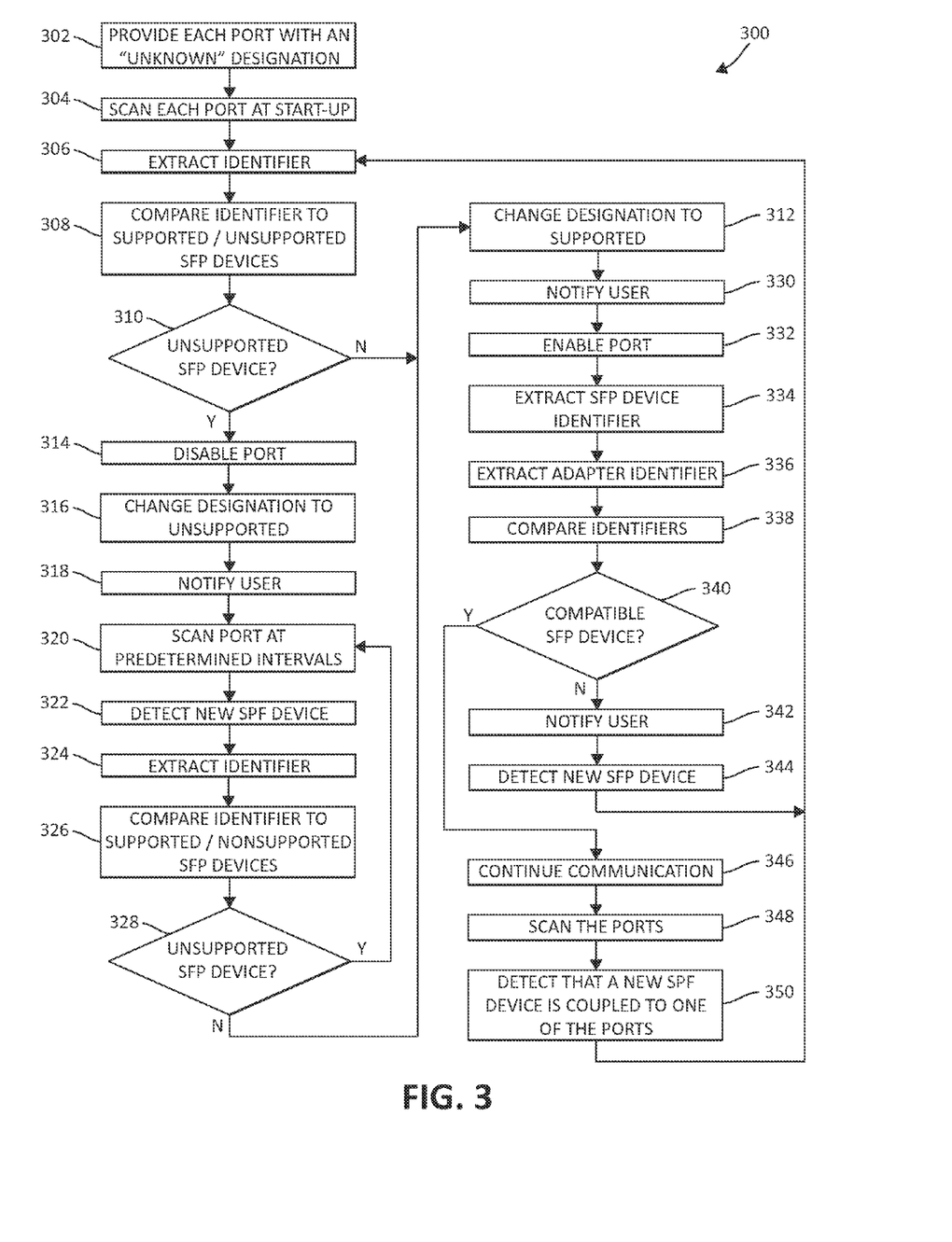
FIG. 3 is a flow diagram of one embodiment of a method for detecting non-supported SFP devices coupled to ports in an adapter.

FIG. 3 is a flow diagram of one embodiment of a method 300 for detecting supported SFP devices coupled to each port (e.g., ports 210) in an adapter (e.g., adapter 200). At least in the illustrated embodiment, method 300 begins by providing, at start-up of the adapter, each port within the adapter with an "unknown" designation or status in a tracking mechanism (e.g., tracking mechanism 220) with respect to SFP devices coupled to the ports (block 302).

Method 300 continues by scanning each port at start-up to detect any SFP devices coupled to the ports 110 (block 304). As each SFP device is detected, an identifier (e.g., VPD) is extracted from the SFP device (block 306) and compared to a group of supported and/or unsupported SFP devices stored in the tracking mechanism (block 308). Method 300 then determines if the SFP device is a non-supported SFP device for the adapter (block 310).

In one embodiment, a SFP device is a "non-supported" SFP device for the adapter if the SFP device is designated as "non-supported" in the tracking mechanism. In another embodiment, a SFP device is a "non-supported" SFP device for the adapter if the SFP device is not designated as "supported" in the tracking mechanism. In yet another embodiment, a SFP device is a "non-supported" SFP device for the adapter if the SFP device is designated as "non-supported" in the tracking mechanism and is not designated as "supported" in the tracking mechanism.

If the SFP device coupled to a particular port is a supported SFP device, method 300 includes changing the designation of the SFP device from "unknown" to "supported" in the tracking mechanism (block 312). If the SFP device coupled to the particular port is a non-supported SFP device, method 300 includes disabling the particular port (e.g., turning off the light in a Fibre Channel port) (block 314), changing the designation of the SFP device from "unknown" to "non-supported" in the tracking mechanism (block 316), and notifying the user that a non-supported SFP device is coupled to the particular port (block 318).

After the particular port is disabled (e.g., the light for a Fibre Channel port is off), method 300 includes scanning the particular port at predetermined intervals of time to determine if a different SFP device has been subsequently coupled to the particular port (block 320). In one embodiment, the scan occurs on the particular port about every sixty seconds in determining if a different SFP device has been subsequently coupled to the particular port. In other embodiments, the scan occurs on the particular port at intervals of less than sixty seconds or greater than sixty seconds in determining if a different SFP device has been subsequently coupled to the particular port. As such, the predetermined intervals of method 300 may occur at any amount of time appropriate for a particular adapter and/or application.

Method 300 continues by detecting a new SFP device coupled to the particular port (block 322). After the new SFP device is detected, method 300 includes extracting an identifier (e.g., VPD) from the new SFP device (block 324) and comparing the identifier to the group(s) of supported and/or unsupported SFP devices stored in the tacking mechanism (block 326). Method 300 further includes determining if the new SFP device is a non-supported SFP device for the adapter (block 328).

If the new SFP device is an unsupported SFP device, method 300 includes continuing to scan the particular port at the predetermined interval (block 320) such that the port is identified as being coupled to a "non-supported" SFP device in the tracking mechanism. If the new SFP device is a supported SFP device, method 300 includes changing the designation of the SFP device coupled to the particular port from "unknown" to "supported" in the tracking mechanism (block 312).

After the designation of a port has been changed to the "supported" designation or status, method 300 includes notifying the user that a supported SFP device is coupled to the port (block 330). Method 300 further includes enabling the particular port (e.g., turning on the light for a Fibre Channel port) (block 332).

Method 300 also includes extracting the identifier (e.g., VPD) from the supported SFP device (block 334), extracting the identifier (e.g., VPD) from the adapter (block 336), and comparing the identifiers (block 338). Method 300 further includes determining if each "supported" SFP device is compatible with the adapter based on the comparison (block 340).

If the supported SFP device is incompatible with the adapter, method 300 includes notifying the user that the adapter is coupled to an incompatible SFP device (block 342). Method 300 further includes detecting that a new SFP device has been coupled to the particular port (block 344) and extracts the identifier (e.g., VPD) from the supported SFP device (block 306).

If the supported SFP device is compatible with the adapter, method 300 including enabling the SFP device to continue communicating with the adapter (block 346). In one embodiment, method 300 includes determining if the supported SFP device and the adapter are both short-wave devices. In another embodiment, method 300 includes determining if the supported SFP device and the adapter are both long-wave devices.

Method 300 is performed for each port in the adapter. After each port is coupled to a supported SFP device that is compatible with the adapter, method 300 continues to scan the ports in the adapter to determine if a new SFP device has been coupled to one or more of the ports (block 348). When a new SFP is detected as being coupled to and/or replacing a previously coupled compatible, supported SFP device, method 300 includes extracting the identifier (e.g., VPD) from the new SFP device (block 306) and performing the remainder of method 300 until the port is coupled to a compatible, supported SFP device.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, random access memory ("RAM"), ready only memory ("ROM"), an erasable programmable read only memory ("EPROM"), a Flash memory, an optical fiber, a compact disc read only memory ("CD-ROM"), an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

The invention claimed is:

1. A system for detecting supported small form-factor pluggable (SFP) devices coupled to an adapter, comprising:
   a plurality of ports, each port configured to be coupled to a SFP device;
   a tracking device configured to store data representing a first list of supported SFP devices for the adapter; and
   a processor coupled to each of the plurality of ports and the tracking device, wherein the processor is configured to:
      scan each port at start-up,
      determine whether a SFP device coupled to any of the plurality of ports is on the first list of supported SFP devices for the adapter,
      if the SFP device is not on the first list of supported SFP devices for the adapter, identify the SFP device as a non-supported SFP device,
      if the SFP device is identified as a non-supported SFP device, disable the one of the plurality of ports that is coupled to the SFP device that is a non-supported SFP device, change the designation of the SFP device from an unknown designation to a non-supported designation, and notify the user that the SFP device is a non-supported SFP device and coupled to the one of the plurality of ports,
      if the SFP device is on the first list of supported SFP devices, determine if the SFP device and the adapter are both long-wave devices or both short-wave devices,
      if the SFP device and the adapter are not both long-wave devices or both short-wave devices, identify the SFP device as an incompatible SFP device,
      create a list including each port that is coupled to an incompatible SFP device, and
      provide the list to a user.

2. The system of claim 1, wherein the processor is further configured to:
   create a second list including each port that is coupled to a non-supported SFP device; and
   provide the second list to a user.

3. The system of claim 2, wherein the processor is further configured to scan each port included on the second list to determine if any ports have been subsequently coupled to a supported SFP device.

4. The system of claim 3, wherein the processor is further configured to:
   remove from the second list any ports that have been coupled to a supported SFP device; and
   enable any ports that have been coupled to a supported SFP device.

5. The system of claim 3, wherein the processor is configured to continue scanning each port included on the second list at a predetermined interval of time in determining if any ports have been subsequently coupled to a supported SFP device.

6. The system of claim 1, wherein the processor is configured to compare each SFP device coupled to the plurality of ports to the first list of supported SFP devices for the adapter in determining if any of the plurality of ports is coupled to a non-supported SFP device.

7. A method for detecting supported small form-factor pluggable (SFP) devices in an adapter including a plurality of ports, each port configured to be coupled to a SFP device, a tracking device configured to store data representing a first list of supported SFP devices for the adapter, and a processor coupled to each of the plurality of ports and the tracking device, the method comprising:
   scanning, by the processor, each port at start-up;
   determining whether a SFP device coupled to any of the plurality of ports is on the first list of supported SFP devices for the adapter;
   if the SFP device is not on the first list of supported SFP devices for the adapter, identifying the SFP device as a non-supported SFP device;
   if the SFP device is identified as a non-supported SFP device, disabling the one of the plurality of ports that is coupled to the SFP device that is a non-supported SFP device, changing the designation of the SFP device from an unknown designation to a non-supported designation, and notifying the user that the SFP device is a non-supported SFP device and coupled to the one of the plurality of ports;
   if the SFP device is on the first list of supported SFP devices, determining if the SFP device and the adapter are both long-wave devices or both short-wave devices;
   if the SFP device and the adapter are not both long-wave devices or both short-wave devices, identifying the SFP device as an incompatible SFP device;
   creating a list including each port that is coupled to an incompatible SFP device; and
   providing the list to a user.

8. The method of claim 7, further comprising:
   creating a second list including each port that is coupled to a non-supported SFP device; and
   providing the second list to a user.

9. The method of claim 8, further comprising scanning each port included on the second list to determine if any ports have been subsequently coupled to a supported SFP device.

10. The method of claim 9, further comprising:
   removing from the second list any ports that have been coupled to a supported SFP device; and
   enabling any ports that have been coupled to a supported SFP device.

11. The method of claim 9, wherein scanning each port included on the second list comprises scanning each port included on the second list at a predetermined interval of time.

12. The method of claim 7, wherein determining if any of the plurality of ports is coupled to a non-supported SFP device comprises comparing each SFP device coupled to the plurality of ports to the first list of supported SFP devices for the adapter.

13. A physical computer storage medium comprising a computer program product method for detecting supported small form-factor pluggable (SFP) devices in an adapter including a plurality of ports, each port configured to be coupled to a SFP device, a tracking device configured to store data representing a first list of supported SFP devices for the adapter, and a processor coupled to each of the plurality of ports and the tracking device, the physical storage medium comprising:
   computer code for scanning, by the processor, each port at start-up;
   computer code for determining whether a SFP device coupled to any of the plurality of ports is on the first list of support SFP devices for the adapter;
   if the SFP device is not on the first list of supported SFP devices for the adapter, computer code for identifying the SFP device as a non-supported SFP device;
   if the SFP device is identified as a non-supported SFP device, computer code for disabling the one of the plurality of ports that is coupled to the SFP device that is a non-supported SFP device, changing the designation of the SFP device from an unknown designation to a non-supported designation, and notifying the user that the SFP device is a non-supported SFP device and coupled to the one of the plurality of ports;
   if the SFP device is on the first list of supported SFP devices, computer code for determining if the SFP device and the adapter are both lone-wave devices or both short-wave devices;
   if the SFP device and the adapter are not both lone-wave devices or both short-wave devices, computer code for identifying the SFP device as an incompatible SFP device;
   computer code for creating a list including each port that is coupled to an incompatible SFP device; and
   computer code for providing the list to a user.

14. The physical computer storage medium of claim 13, further comprising:
   computer code for creating a second list including each port that is coupled to a non-supported SFP device; and
   computer code for providing the second list to a user.

15. The physical computer storage medium of claim 14, further comprising computer code for scanning each port included on the second list to determine if any ports have been subsequently coupled to a supported SFP device.

16. The physical computer storage medium of claim 15, further comprising:
   computer code for removing from the second list any ports that have been coupled to a supported SFP device; and
   computer code for enabling any ports that have been coupled to a supported SFP device.

17. The physical computer storage medium of claim 13, wherein the computer code for determining if any of the plurality of ports is coupled to a non-supported SFP device comprises computer code for comparing each SFP device coupled to the plurality of ports to the first list of supported SFP devices for the adapter.

* * * * *